(12) United States Patent
Shirotori et al.

(10) Patent No.: US 12,117,642 B2
(45) Date of Patent: Oct. 15, 2024

(54) MICROREPLICATED OPTICAL FILM

(71) Applicant: 3M INNOVATIVE PROPERTIES COMPANY, St. Paul, MN (US)

(72) Inventors: Hideaki Shirotori, Yokohama (JP); Kazuhiko Toyooka, Yamagata (JP); Sayaka Kado, Yamato (JP); Gary T. Boyd, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 18/037,396

(22) PCT Filed: Nov. 10, 2021

(86) PCT No.: PCT/IB2021/060401
§ 371 (c)(1),
(2) Date: May 17, 2023

(87) PCT Pub. No.: WO2022/106962
PCT Pub. Date: May 27, 2022

(65) Prior Publication Data
US 2024/0004124 A1    Jan. 4, 2024

Related U.S. Application Data

(60) Provisional application No. 63/116,288, filed on Nov. 20, 2020.

(51) Int. Cl.
*F21V 8/00* (2006.01)

(52) U.S. Cl.
CPC ......... *G02B 6/0068* (2013.01); *G02B 6/0016* (2013.01); *G02B 6/0025* (2013.01); *G02B 6/0073* (2013.01)

(58) Field of Classification Search
CPC .............. G02B 6/0068; G02B 6/0016; G02B 6/0025; G02B 6/0073
See application file for complete search history.

(56) References Cited

U.S. PATENT DOCUMENTS

| 5,592,578 A * | 1/1997 | Ruh | G02B 19/0028 |
| | | | 257/E33.071 |
| 9,109,774 B1 * | 8/2015 | Winters | G02B 19/0066 |

(Continued)

FOREIGN PATENT DOCUMENTS

| CN | 110398858 A | 11/2019 |
| JP | 2010027229 A | 2/2010 |

(Continued)

OTHER PUBLICATIONS

Chen, CN 106449722, Feb. 2017 (Year: 2017).*
Luo et al., CN 110398858, Nov. 2019 (Year: 2019).*

(Continued)

*Primary Examiner* — Mary Ellen Bowman
(74) *Attorney, Agent, or Firm* — Jonathan L. Tolstedt

(57) ABSTRACT

A backlight includes a plurality of discrete light sources configured to face a display, and an optical film disposed on the light sources and below and proximate a first plane. The optical film includes a plurality of through-holes extending between first and second major surfaces of the optical film. Each through-hole has a first opening at the first major surface, and a second opening at the second major surface with an open area A2. Each through-hole has length, H, such that H/A2 is greater than or equal to about 0.13. The light from the light sources has a first overall peak intensity in the first plane, and a first brightness uniformity across the first plane, and in the absence of the optical film, the light from the light sources has a second overall peak intensity in the first plane, and a second brightness uniformity across the first plane, such that the first and second overall peak intensities are different by less than about 20%, and the first (Continued)

brightness uniformity exhibits an improvement over the second brightness uniformity by at least 2.8%.

20 Claims, 9 Drawing Sheets

(56) References Cited

U.S. PATENT DOCUMENTS

| | | | |
|---|---|---|---|
| 9,182,529 B2* | 11/2015 | Tai | G02B 6/0001 |
| 9,581,739 B2 | 2/2017 | Sahlin et al. | |
| 2005/0185416 A1 | 8/2005 | Lee et al. | |
| 2010/0165472 A1 | 7/2010 | Hamasaki et al. | |
| 2010/0247866 A1 | 9/2010 | Nakahata et al. | |
| 2012/0014132 A1* | 1/2012 | Chiang | G02B 6/0051 |
| | | | 362/606 |
| 2016/0298828 A1 | 10/2016 | Chang et al. | |

FOREIGN PATENT DOCUMENTS

| | | |
|---|---|---|
| JP | 5323709 B2 | 10/2013 |
| WO | 2009041279 A1 | 4/2009 |

OTHER PUBLICATIONS

Zhang et al., CN 215219373, Dec. 2021 (Year: 2021).*
"Z10X High image quality / LED REGZA" Toshiba, [retrieved from the internet on Jul. 11, 2023], URL: <https://archived.regza.com/regza/lineup/z10x/quality.html>, 2023, pp. 1-5.
International Search Report for PCT International Application No. PCT/IB2021/060401, mailed on Mar. 10, 2022, 4 pages.

* cited by examiner

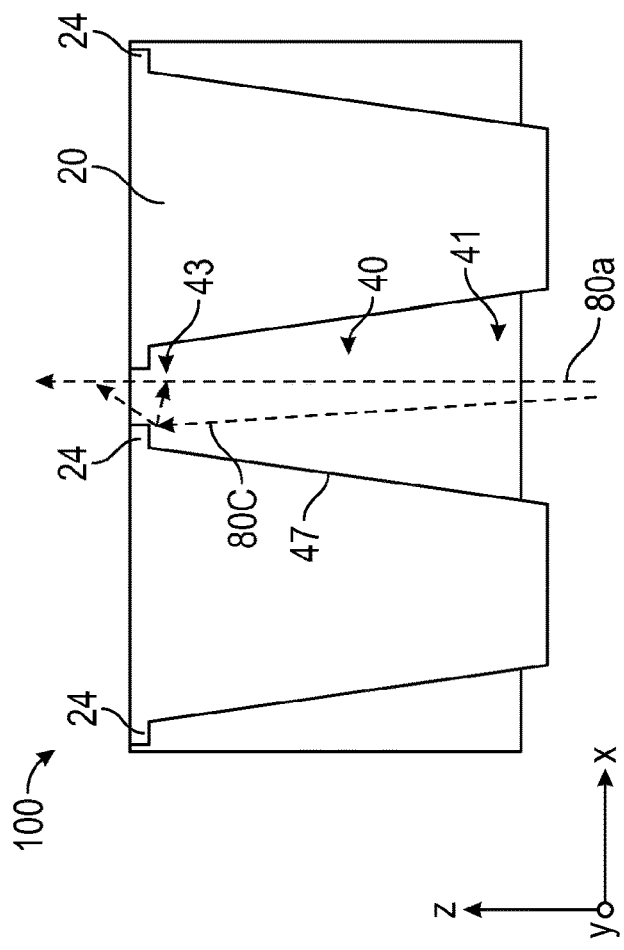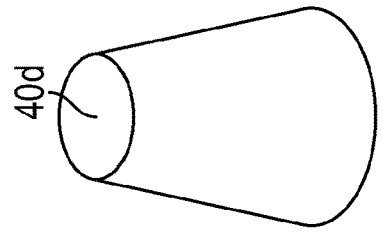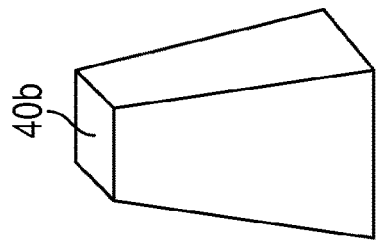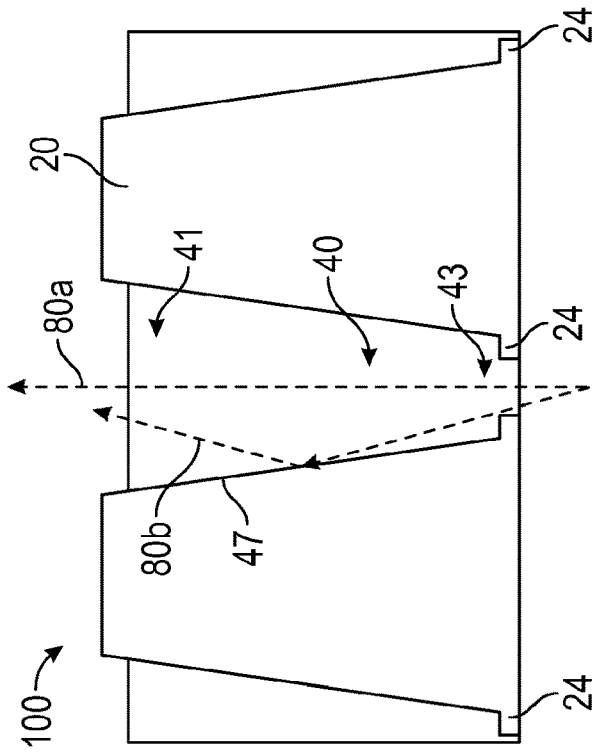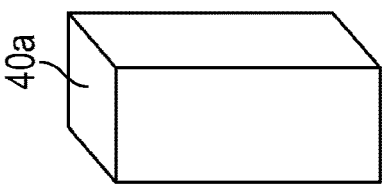
FIG. 3A
FIG. 3B
FIG. 3C

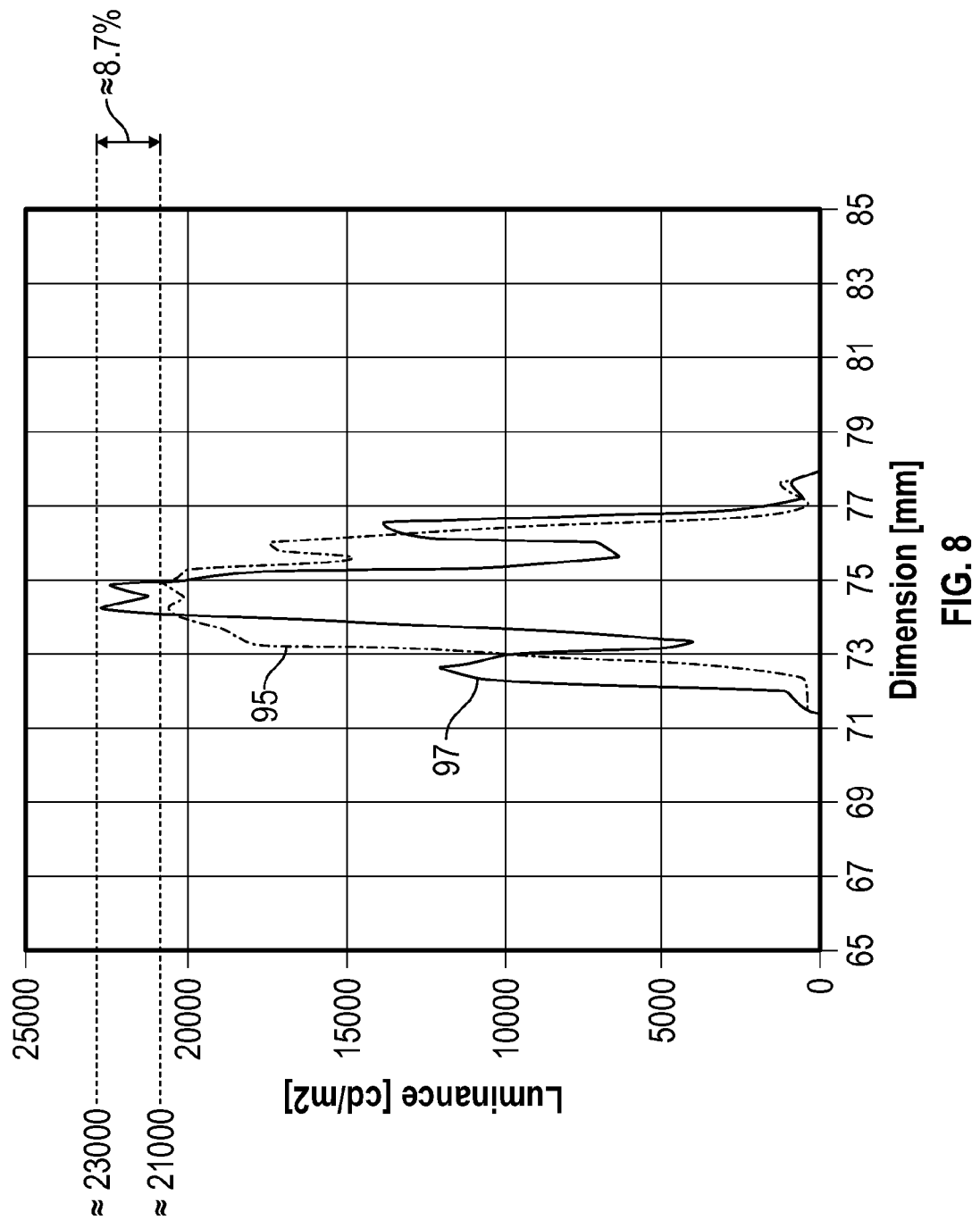

MICROREPLICATED OPTICAL FILM

CROSS REFERENCE TO RELATED APPLICATIONS

This application is a national stage filing under 35 U.S.C. 371 of PCT/IB2021/060401, filed Nov. 10, 2021, which claims the benefit of Provisional Application No. 63/116,288, filed Nov. 20, 2020, the disclosures of which are incorporated by reference in their entireties herein.

SUMMARY

In some aspects of the present description, a backlight for providing illumination along a first direction to a display disposed thereon is provided, the backlight including a plurality of spaced apart discrete light sources arranged in rows and columns of the light sources and configured to face the display, and an optical film disposed on the light sources and below and proximate a first plane. The optical film and the first plane are configured to be disposed between the display and the light sources. The optical film includes a plurality of through-holes arranged in rows and columns of the through-holes and extending between first and second major surfaces of the optical film. Each through-hole has a first opening with a first open area, A1, at the first major surface, and a second opening with a second open area, A2, at the second major surface. Each through-hole has a length, H, along the first direction such that the ratio of H/A2 is greater than or equal to about 0.13. When all the light sources emit light, the light emitted by all the light sources has a first overall peak intensity as measured in the first plane, and a first brightness uniformity as measured across the first plane. In the absence of the optical film, the light emitted by all the light sources has a second overall peak intensity as measured in the first plane, and a second brightness uniformity as measured across the first plane. The first and second overall peak intensities are different by less than about 20%, and the first brightness uniformity exhibits an improvement over the second brightness uniformity by at least 2.8%.

In some aspects of the present description, an optical film is provided, the optical film including a structured first major surface opposite a second major surface. The first major surface includes a plurality of posts arranged in rows and columns, and a plurality of ridges extending between, and recessed relative to, the posts. A plurality of through-holes extends between the first and second major surfaces, and each through-hole includes a first opening at the first major surface defined by, and recessed relative to, a number of ridges in the plurality of ridges, and having a first maximum dimension, and a second opening at the second major surface, and having a second maximum dimension different than the first maximum dimension.

In some aspects of the present description, an optical film is provided, the optical film including a structured first major surface opposite a second major surface. The first major surface includes a plurality of posts arranged in rows and columns, and a plurality of ridges extending between, and recessed relative to, the posts, and a plurality of recesses extending from the first major surface into the optical film in a thickness direction. Each recess includes a first open end at the first major surface defined by, and recessed relative to, a number of ridges in the plurality of ridges, and having a first maximum dimension, and a second closed end recessed from the first open end by a distance D and having a second maximum dimension different than the first maximum dimension.

In some aspects of the present description, a backlight for providing illumination along a first direction to a display disposed thereon is provided, the backlight including a plurality of spaced apart discrete light sources arranged in rows and columns of the light sources and configured to face the display, and an optical film having a structured first major surface opposite a second major surface, and a plurality of through-holes extending between the first and second major surfaces. The optical film is disposed on the light sources and below and proximate a first plane. The optical film and the first plane are configured to be disposed between the display and the light sources. When the optical film is disposed such that the first major surface faces the light sources, an average luminance in the first plane is smaller and a first brightness uniformity value is smaller, and when the optical film is disposed such that the second major surface faces the light sources, the first average luminance in the first plane is greater and the first brightness uniformity value is greater, wherein brightness uniformity value is calculated by dividing a maximum luminance value in the first plane by a minimum luminance value in the first plane.

BRIEF DESCRIPTION OF THE DRAWINGS

FIGS. 3A-3C provide additional details and embodiments of an optical film, in accordance with an embodiment of the present description;

FIG. 8 is a plot comparing the peak brightness values for a display with and without an optical film disposed on the backlight, in accordance with an embodiment of the present description.

DETAILED DESCRIPTION

Figure 1A:
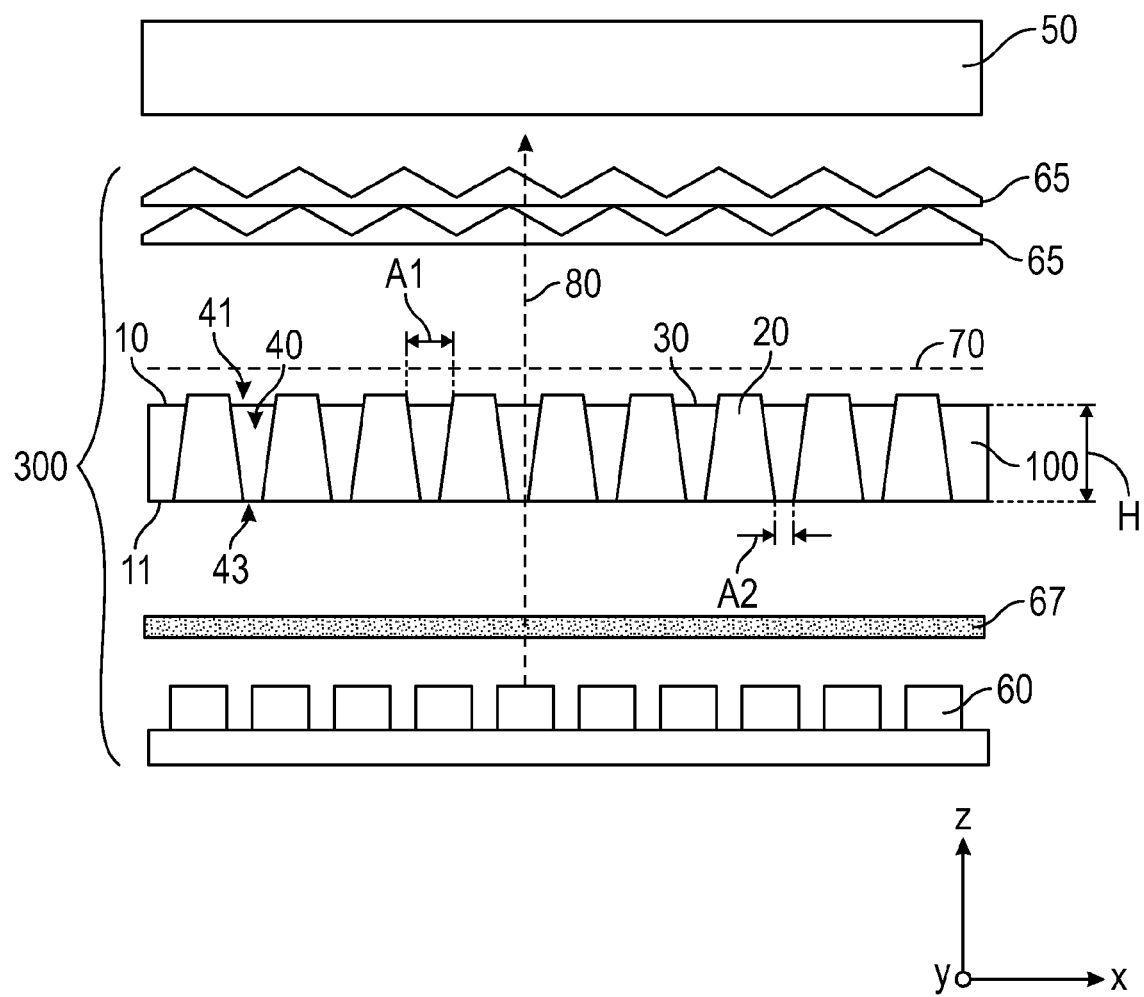
FIGS. 1A and 1B provide side views of a backlight for providing illumination to a display, in accordance with an embodiment of the present description.

In the following description, reference is made to the accompanying drawings that form a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

According to some aspects of the present description, a backlight for providing illumination along a first direction (e.g., a thickness direction, or z-axis, of the backlight) to a display disposed thereon includes a plurality of spaced apart discrete light sources (e.g., light-emitting diodes) arranged in rows (e.g., along an x-axis of the backlight) and columns (e.g., along a y-axis of the backlight) of the light sources and configured to face the display, and an optical film disposed on the light sources and below and proximate a first plane. The optical film and the first plane are configured to be disposed between the display and the light sources.

In some embodiments, the optical film may include a plurality of through-holes arranged in rows and columns of the through-holes and extending between first (e.g., top) and second (e.g., bottom) major surfaces of the optical film. In some embodiments, each through-hole has a first opening with a first open area, A1, at the first major surface, and a second opening with a second open area, A2, at the second major surface. In some embodiments, each through-hole has a length, H, along the first direction such that the ratio of H/A2 is greater than or equal to about 0.13.

In some embodiments, the shape of at least a portion of each through-hole may be substantially a truncated square pyramid, or a truncated cone, or a cylinder, or a rectangular prism, or any other appropriate shape. In some embodiments, the slope of any of the inner walls of each of the through-holes may be substantially vertical (e.g., in the case of a cylindrical shape or rectangular prism shape). In other embodiments (e.g., in the case of a truncated square pyramid shape or truncated cone shape), the slope of any of the inner walls of each of the through-holes may be within ±15 degrees, or within ±10 degrees, or within ±8 degrees of the first direction (e.g., along the z-axis).

In some embodiments, the open area, A1, may be greater than the open area, A2. In other embodiments, A1 may be less than A2. In still other embodiments, A1 and A2 may be substantially equal. In some embodiments, when A1 is greater than A2 and the optical film is disposed such that A1 faces the light sources, a first average luminance in the first plane may be smaller and the first brightness uniformity may be greater. In other embodiments, when A1 is greater than A2 and the optical film is disposed such that A2 faces the light sources, the first average luminance in the first plane is greater and the first brightness uniformity is greater. Stated another way, when A1 and A2 have different areas, placing the film with the larger hole "up" (i.e., toward the display) and the smaller hole "down" (i.e., toward the light sources) may exhibit a relatively brighter average luminance and a relatively greater brightness uniformity value, when compared to the values measured when the film is reversed (larger hole "down," smaller hole "up"), where it may exhibit a relatively smaller average luminance and a relatively smaller brightness uniformity value (i.e., a more uniform display brightness).

When all the light sources emit light, the light emitted by all the light sources has a first overall peak intensity as measured in the first plane, and a first brightness uniformity as measured across the first plane. In the absence of the optical film, the light emitted by all the light sources has a second overall peak intensity as measured in the first plane, and a second brightness uniformity as measured across the first plane. The first and second overall peak intensities are different by less than about 20%, and the first brightness uniformity exhibits an improvement over the second brightness uniformity by at least 2.8%. In some embodiments, the light emitted by all the light sources may have a first average luminance in the first plane, and, in the absence of the optical film, the light emitted by all the light sources may have a second average luminance in the first plane, such that the first average luminance is greater than or equal to the second average luminance.

For the purposes of this specification, "brightness uniformity" (or simply "uniformity") shall be defined as a maximum luminance value divided by a minimum luminance value as measured across the display or a portion of a display being measured. That is, the term "uniformity", as used herein, is a specific, measured value for a display or portion of a display, and only has meaning when compared relative to a second measured uniformity value. For example, a larger value for the uniformity as calculated in this fashion is less desirable than a smaller value. That is, a larger uniformity value represents an increase in "luminance mum", or uneven spots on a display. For the purposes of this specification, the terms "nonuniformity" and "luminance mura" may be used interchangeably, and shall describe undesirable, visible brightness effects on a display (such as a spot on the display that is obviously brighter or dimmer than the surrounding areas of the display).

In the example above, when "the first brightness uniformity exhibits an improvement over the second brightness uniformity by at least 2.8%," this means that the value measured for the first brightness uniformity is less than (has fewer luminance mum than) the value measured for the second brightness uniformity by at least 2.8%.

In some embodiments, the backlight may further include a diffusing film disposed between the light sources and the optical film. In some embodiments, the backlight may further include one or more brightness enhancement films (e.g., prism films) disposed between the optical film and the display.

According to some aspects of the present description, an optical film may include a structured first major surface opposite a second major surface. The first major surface may include a plurality of posts arranged in rows and columns (e.g., arranged along an x- and y-axis of the optical film), and a plurality of ridges extending between, and recessed relative to, the posts. In some embodiments, a plurality of through-holes may extend between the first and second major surfaces, and each through-hole may include a first opening at the first major surface defined by, and recessed relative to, a number of ridges in the plurality of ridges, and a second opening at the second major surface. In some embodiments, the first opening may have a first maximum dimension, the second opening may have a second maximum dimension which is different than the first maximum dimension. In some embodiments, the first opening of each through-hole is defined by and surrounded by four ridges in the plurality of ridges. In some embodiments, each through-hole of the plurality of through-holes may define a distance, H, between the first opening and the second opening, and the second opening may have an open area A2, such that the ratio of H/A2 is greater than or equal to about 0.13.

In some embodiments, the shape of at least a portion of each through-hole may be substantially a truncated square pyramid, or a truncated cone, or a cylinder, or a rectangular prism, or any other appropriate shape. In some embodiments, the slope of any of the inner walls of each of the through-holes may be substantially vertical. In other embodiments, the slope of any of the inner walls of each of the through-holes may be within ±15 degrees, or within ±10 degrees, or within ±8 degrees of the first direction (e.g., along the z-axis).

According to some aspects of the present description, a backlight for providing illumination to a display may include a plurality of spaced-apart, discrete light sources arranged in rows (e.g., an x-axis) and columns (e.g., a y-axis) of the light sources and configured to face the display, and any of the optical films including through-holes as described herein disposed on the plurality of spaced apart discrete light sources and below and proximate a first plane.

In some embodiments, when all the light sources emit light, the light emitted by all the light sources has a first overall peak intensity in the first plane, and a first brightness uniformity across the first plane. In the absence of the optical film, the light emitted by all the light sources may have a second overall peak intensity in the first plane, and a second brightness uniformity across the first plane, such that the first and second overall peak intensities are different by less than about 20%, or about 15%, or about 10%, and the first brightness uniformity exhibits an improvement over the second brightness uniformity by at least 2.8%. In some embodiments, the light emitted by all the light sources may have a first average luminance in the first plane, and, in the absence of the optical film, the light emitted by all the light sources may have a second average luminance in the first plane, such that the first average luminance is greater than or equal to the second average luminance.

According to some aspects of the present description, an optical film includes a structured first major surface opposite a second major surface. In some embodiments, the first major surface may include a plurality of posts arranged in rows and columns (e.g., the x- and y-axis of the optical film), and a plurality of ridges extending between, and recessed relative to, the posts, and a plurality of recesses extending from the first major surface into the optical film in a thickness direction (e.g., the z-axis of the optical film). In some embodiments, each recess may include a first open end at the first major surface defined by, and recessed relative to, a number of ridges in the plurality of ridges, and a second closed end recessed from the first open end by a distance, D. The first open end may have a first maximum dimension, and the second closed end may have a second maximum dimension different than the first maximum dimension. In some embodiments, the first open end of each recess may be defined by and surrounded by four ridges of the plurality of ridges. In some embodiments, the second closed end of each recess may have a surface area, A4, such that the ratio of D/A4 is greater than or equal to about 0.13.

In embodiments, the shape of at least a portion of each of the recesses may be a truncated square pyramid, or a truncated cone, or a cylinder, or a rectangular prism. In some embodiments, the slope of at least one inner wall of each of the recesses may be substantially vertical. In other embodiments, the slope of at least one inner wall of each of the recesses may be within ±15 degrees (or within ±10 degrees or within ±8 degrees) of the thickness direction of the optical film.

According to some aspects of the present description, a backlight for providing illumination to a display may include a plurality of spaced-apart, discrete light sources arranged in rows (e.g., an x-axis) and columns (e.g., a y-axis) of the light sources and configured to face the display, and any of the optical films including recesses as described herein disposed on the plurality of spaced apart discrete light sources and below and proximate a first plane.

In some embodiments, when all the light sources emit light, the light emitted by all the light sources has a first overall peak intensity in the first plane, and a first brightness uniformity across the first plane. In the absence of the optical film, the light emitted by all the light sources may have a second overall peak intensity in the first plane, and a second brightness uniformity across the first plane, such that the first and second overall peak intensities are different by less than about 20%, or about 15%, or about 10%, and the first brightness uniformity exhibits an improvement over the second brightness uniformity by at least 2.8%. In some embodiments, the light emitted by all the light sources may have a first average luminance in the first plane, and, in the absence of the optical film, the light emitted by all the light sources may have a second average luminance in the first plane, such that the first average luminance is greater than or equal to the second average luminance.

According to some aspects of the present description, a backlight for providing illumination along a first direction to a display disposed thereon may include a plurality of spaced apart discrete light sources (e.g., light-emitting diodes) arranged in rows and columns (e.g., the x-axis and y-axis) of the light sources and configured to face the display, and an optical film having a structured first major surface opposite a second major surface, and a plurality of through-holes extending between the first and second major surfaces. In some embodiments, the optical film may be disposed on the light sources and below and proximate a first plane. In some embodiments, the optical film and the first plane are configured to be disposed between the display and the light sources.

In some embodiments, when the optical film is disposed such that the first major surface faces the light sources, an average luminance in the first plane is smaller and a first brightness uniformity value is smaller, and when the optical film is disposed such that the second major surface faces the light sources, the first average luminance in the first plane is greater and the first brightness uniformity value is greater, wherein the brightness uniformity value is calculated by dividing a maximum luminance value in the first plane by a minimum luminance value in the first plane.

In some embodiments, each through-hole may have a first opening disposed at the first major surface and having an open area A1, and a second opening disposed at the second major surface and having an open area A2. In some embodiments, each through-hole of the plurality of through-holes defines a distance, H, between the first opening and the second opening, such that H/A2 is greater or equal to about 0.13. In some embodiments, at least one of the first opening and the second opening may include a lip protruding outwardly from a perimeter of the opening toward a center of the opening. In some embodiments, light passing through the through-hole may be scattered by the lip.

Turning now to the figures, FIG. 1A is a side view of a backlight for providing illumination to a display, according to the present description. In some embodiments, a backlight 300 for providing illumination 80 to a display 50 may include a plurality of spaced-apart, discrete light sources 60 and an optical film 100. In some embodiments, the discrete light sources 60 face the display (i.e., emit light 80 toward the display, in the z-direction shown in FIG. 1A) and are arranged in rows and columns of the light sources 60 (e.g., a matrix of light-emitting diodes with rows in the x-axis and columns in the y-axis, as shown in FIG. 1A). The optical film 100 is disposed on or proximate the light sources 60 and below and proximate a first plane 70 (i.e., a reference plane for discussion purposes). In some embodiments, the optical film 100 includes a plurality of through-holes 40 arranged in rows (e.g., the x-axis) and columns (e.g., the y-axis) of the optical film. Each of the plurality of through-holes 40 extend between a first major surface 10 and a second major surface 11 of the optical film 100. In some embodiments, each through-hole 40 may have a first opening 41 in the first major surface 10 with a first open area A1, and a second opening 43 in the second major surface 11 with a second open area A2. Each through-hole has a length, H, along the first direction (i.e., along the z-axis, as shown in FIG. 1A, or the "thickness direction").

In some embodiments of the optical film, when the ratio of H/A2 is configured such that it is greater than or equal to about 0.13, the light 80 provided by light sources 60 passing through optical film 100 provides a first overall peak intensity (e.g., a brightest spot) in the first plane 70 and a first brightness uniformity (e.g., a point-to-point variation in luminance, causing "bright" and "dim" spots) across the first plane 70. In the absence of the optical film 100, the light 80 has a second overall peak intensity in the first plane 70 and a second brightness uniformity across the first plane 70, such that the first overall peak intensity and the second overall peak intensity are different by less than about 20%, or about 15%, or about 10%, and the first brightness uniformity exhibits an improvement over the second brightness uniformity by at least about 2.8%, or at least about 3.0%, or at least about 5%, or at least about 10%.

In some embodiments, optical film 100 may include a plurality of posts 20 arranged in rows (e.g., the x-axis) and columns (e.g., the y-axis) of the optical film. In some embodiments, optical film 100 may also include a plurality of ridges 30 extending between, and recessed relative to, the posts (i.e., recessed below the highest point of posts 20 relative to the first major surface 10 of optical film 100). In some embodiments, the first opening 41 of each through-hole 40 may be defined by and surrounded by four ridges 30. Additional details on the posts 20 and ridges 30 may be seen in FIGS. 5A-6B.

In some embodiments, the backlight 300 may further include a diffusing film 67 disposed between the light sources 60 and the optical film 100. In some embodiments, the backlight 300 may further include one or more other optical films 65 (e.g., brightness enhancement films, "prism" films, pyramid shaped convex prism films, pyramid shaped concave prism films, reflective polarizer films, diffuser films, microlens films, and/or light recycling films) disposed between the optical film 100 and the display 50.

Figure 1B:
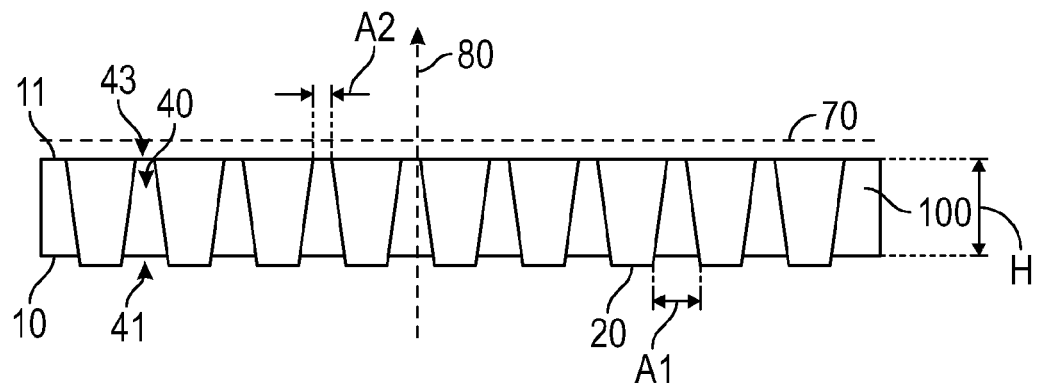

FIG. 1B shows an alternate embodiment of the optical film 100 of FIG. 1A. More specifically, FIG. 1B shows an embodiment when the orientation of the optical film 100 is disposed in an orientation that is the opposite of the orientation of optical film 100 as shown in FIG. 1A, such that second openings 43 are now facing first plane 70 (i.e., optical film 100 of FIG. 1B is "upside down" relative to optical film 100 of FIG. 1A). Other than the orientation of optical film 100, a backlight using the embodiment shown in FIG. 1B may be otherwise identical to the backlight 300 of FIG. 1A. Depending on the size of first opening 41 and second opening 43 relative to each other, the optical performance as measured in first plane 70 may be different based on the orientation of optical film 100. For example, when optical film 100 is disposed such that first opening 41 (and first open area A1) faces the light sources 60 (as shown in FIG. 1A), a first average luminance across first plane 70 may be relatively smaller and the first brightness uniformity may be relatively greater, and when optical film 100 is disposed such that second opening 43 (and second open area A2) faces the light sources 60 (as shown in FIG. 1B), the first average luminance in the first plane 70 may be relatively greater and the first brightness uniformity may be relatively smaller.

Figure 2A:
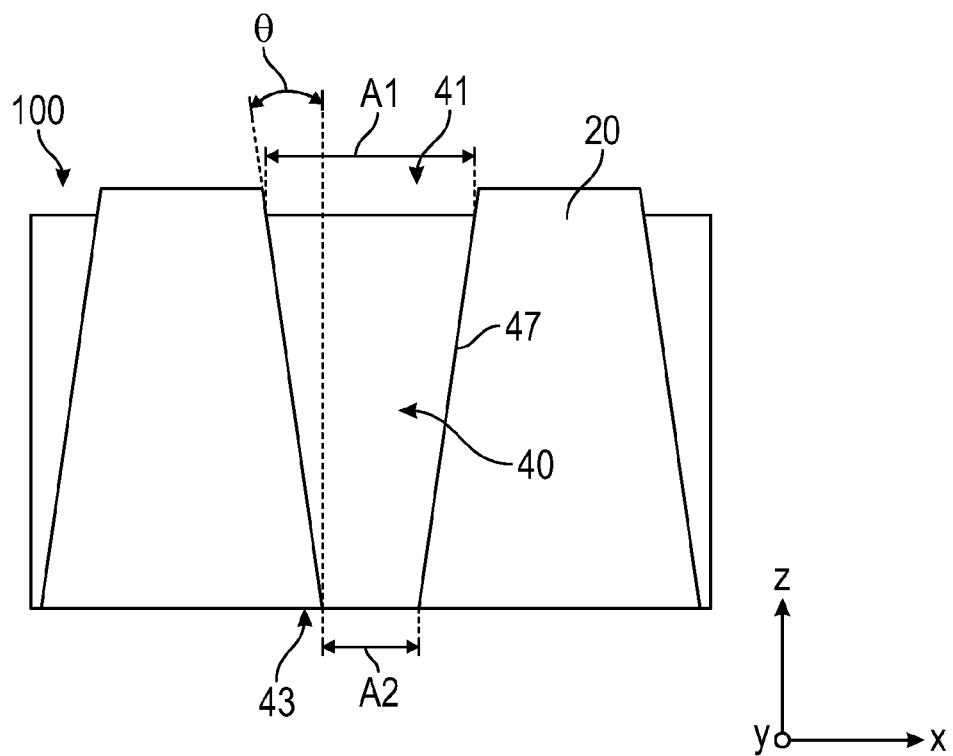
FIGS. 2A and 2B provide side views of the details of an optical film, in accordance with an embodiment of the present description.
Figure 2B:
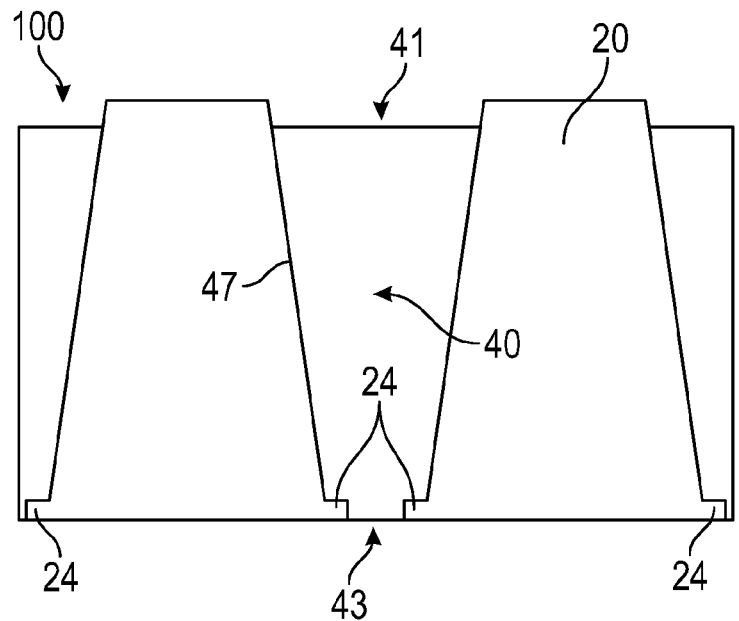

FIGS. 2A and 2B provide side views of the optical film 100 of FIG. 1A featuring additional details, according to the present description. FIG. 1A shows a close-up view of one of the through-holes 40 of optical film 100, where first open area A1 and second open area A2 are different (i.e., the areas are different). It should be noted that FIG. 2A shows one possible embodiment in which first opening 41 is larger than second opening 43, but other embodiments are possible, as discussed elsewhere herein. For example, first opening 41 may be smaller that, or equal to, second opening 43 in some embodiments.

When first open area 41 and second open area A2 are different, one or more of the sidewalls 47 may have a draft angle θ that is within ±15 degrees, or within ±10 degrees, or within ±8 degrees, of the thickness direction (i.e., the z-direction, as shown in FIG. 2A). In embodiments where first open area 41 and second open area A2 are substantially equal, the draft angle θ may be substantially equal to zero (i.e., the sidewalls may be substantially vertical).

FIG. 2B shows an alternate embodiment of through-hole 40 of optical film 100. In some embodiments, at least one of the first opening 41 and the second opening 43 may include a lip 24 protruding outwardly from a perimeter of the opening toward a center of the opening. In some embodiments, light passing lip 24 may be scattered, as shown in FIG. 3B.

FIGS. 3A-3C provide additional details and embodiments of the optical film 100. FIG. 3A shows light rays 80a and 80b passing through optical film 100, where optical film 100 is disposed such that first opening 41 is larger than second opening 43. Light ray 80a, which is already substantially collimated (i.e., already substantially aligned with the z-direction), passes directly through the second opening 43 and then the first opening 41 without being reflected or redirected by a sidewall 47. Light ray 80b, however, enters second opening 43 at an angle, strikes sidewall 47, and is redirected up out of first opening 41. The effect of through-hole 40 is to generally collimate light rays 80 before they illuminate the display. In other embodiments, when first opening 41 is smaller than second opening 43, or when the optical film of FIG. 3A is reversed as shown in FIG. 3B, a similar collimating effect may occur with light rays 80. However, when an opening (such as second opening 43 in FIG. 3B) includes a lip 24 surrounding a perimeter of the opening, lip 24 may have the effect of scattering light rays (such as light ray 80c in FIG. 3B) as the light passes. This light scattering may increase the uniformity of the light 80 as it enters at first plane 70 (see FIG. 1) by adding a diffusion effect. Depending on the requirements of the backlight application, this may be a desirable effect. Comparing the embodiments of FIG. 3A and FIG. 3B, the embodiment of optical film 100 of FIG. 3A may have a better average luminance relative to the average luminance of FIG. 3B, but both embodiments may show an average luminance improvement (i.e., increase in luminance) over a similar backlight without optical film 100. Similarly, the embodiment of optical film 100 of FIG. 3B may have a better brightness uniformity relative to the brightness uniformity of FIG. 3A (due to the scattering/diffusing effect of lip 24), but both embodiments may show an improvement in uniformity over a similar backlight without optical film 100.

FIG. 3C illustrates some of the possible shapes of the through-hole 40, which include a rectangular prism 40a, a truncated square pyramid 40b, a cylinder 40c, and a truncated cone 40d. The shapes of FIG. 3C represent some of the possible shapes formed by the sidewalls of through-hole 40 but is not meant to be limiting. Other shapes are possible.

Also, it should be noted that the shape of through-hole 40 may have imperfections or variances (e.g., lips 24, variation in sidewall angles and surfaces, curved lines, etc.) and may not be perfectly represented by the shapes shown in FIG. 3C. That is, the shape of at least a portion of through-hole 40 may be substantially equal to a truncated square pyramid (for example) but may not be a perfect truncated square pyramid.

Figure 4:
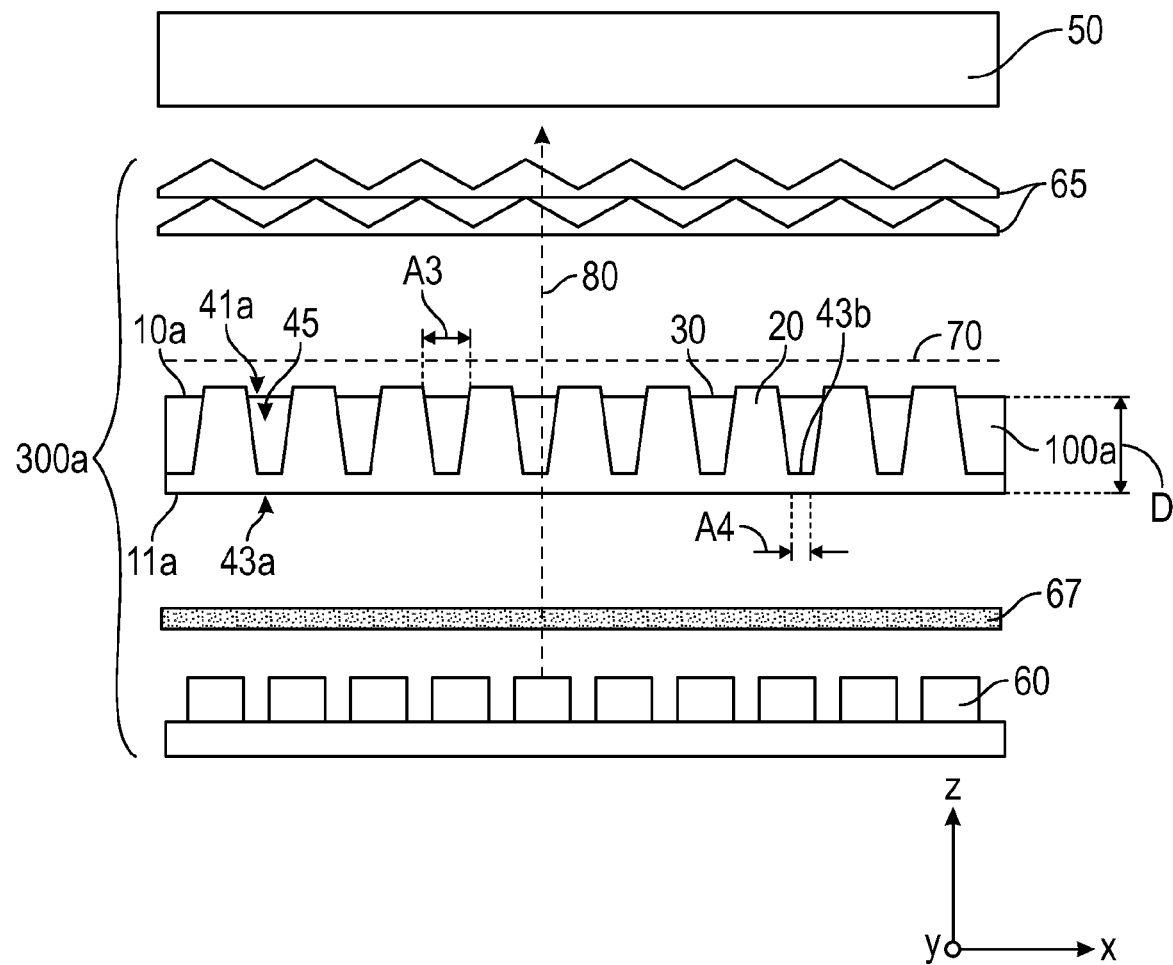
FIG. 4 illustrates a side view of an optical film, in accordance with an alternate embodiment of the present description.

FIG. 4 illustrates a side view of an alternate embodiment of a backlight 300a. The embodiment shown in FIG. 4 is similar to the embodiments of backlight 300 of FIG. 1A and has many common (like-numbered) components. The functionality of any components in FIG. 4 with corresponding like-numbered components in FIG. 1A should be assumed to have a similar functionality and description, unless otherwise specified, and may not be discussed further here. Backlight 300a is configured to provide illumination 80 to a display 50. Backlight 300a includes an optical film 100a, which differs from optical film 100 of FIG. 1A primarily in that optical film 100a includes a plurality of recesses 45 (rather than through-holes 40 as shown in FIG. 1A). Recesses 45 have a first open end 41a at first major surface 10a and a second closed end 43a at second major surface 11a, and have a depth D that extends from first open end 41a to an inner surface 43b of second closed end 43a (i.e., recesses 45 do not extend all the way down to second major surface 11a). Each first open end 41a has a first open area A3, and each second closed end 43a has a second closed area A4 (i.e., the area of inner surface 43b). It has been demonstrated in experiments that optical film 100a with recesses 45 exhibits optical performance improvements similar to optical film 100 with through-holes 40 (see FIG. 1A). It should also be noted that optical film 100a may be disposed in a reverse orientation, with second closed end 43a facing display 50, similar to the embodiment of film 100 shown in FIG. 1B, with similar optical performance benefits. The shapes 40a through 40d shown in FIG. 3C are also applicable to recesses 45 of optical film 100a. In some embodiments, the ratio of the depth D to the closed area A4 may be greater than or equal to about 0.13.

Figure 5A:
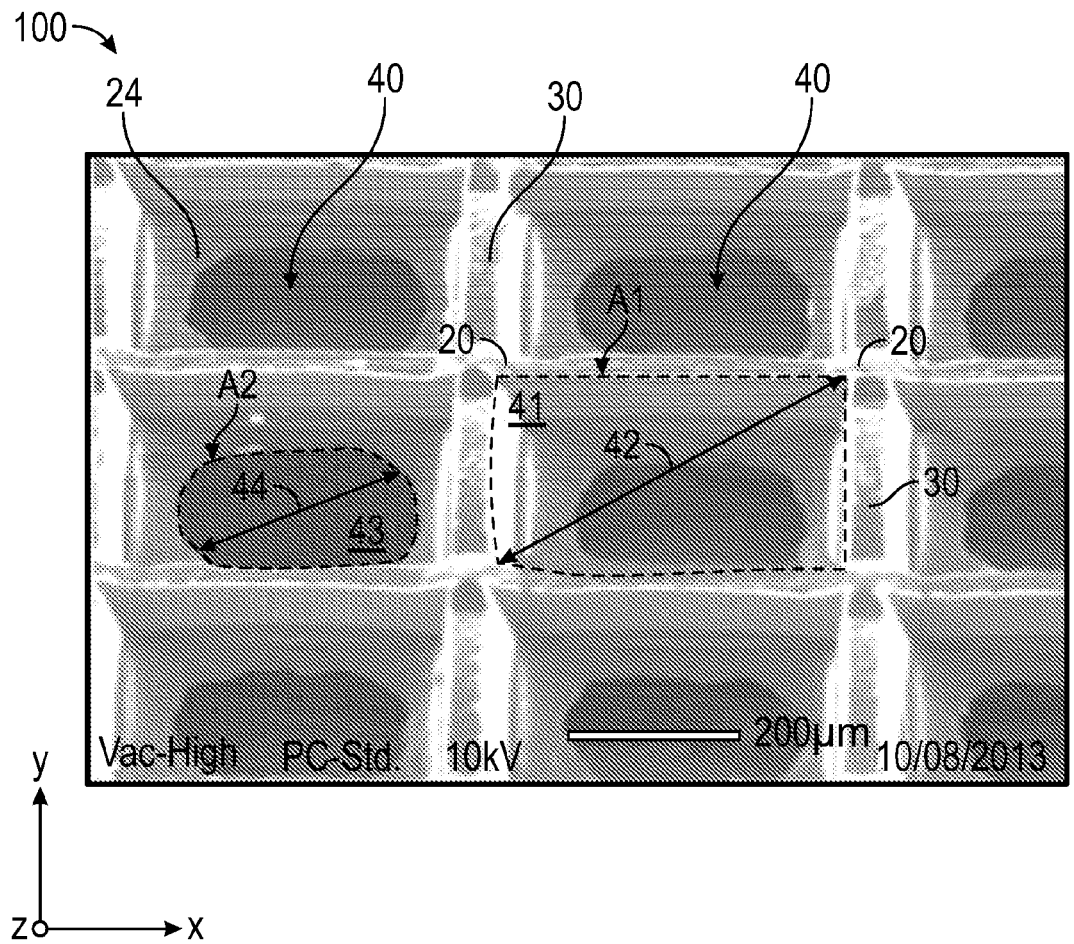
FIGS. 5A and 5B are close-up images of an optical film with microreplicated features, in accordance with an embodiment of the present description.
Figure 5B:
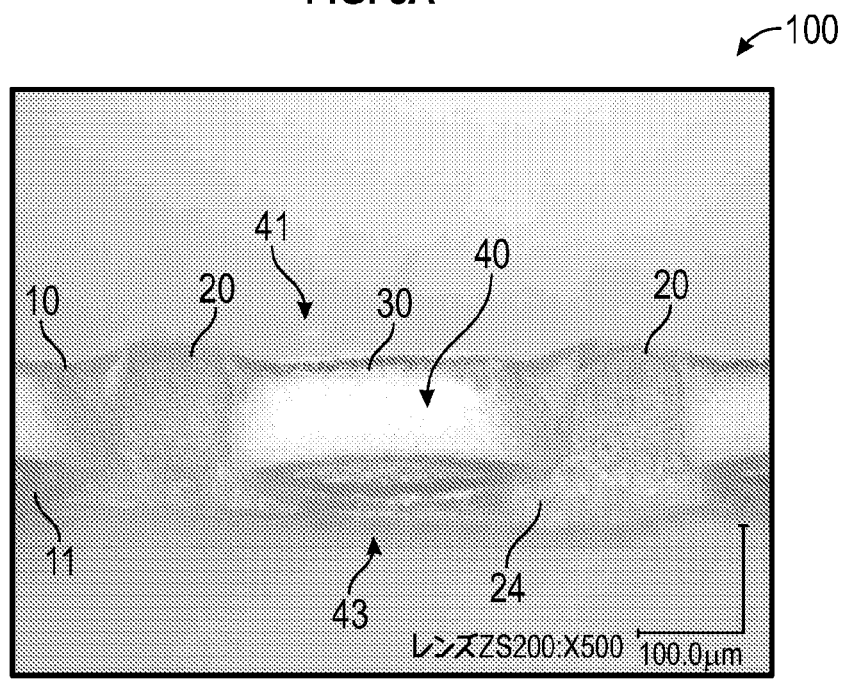
Figure 6A:
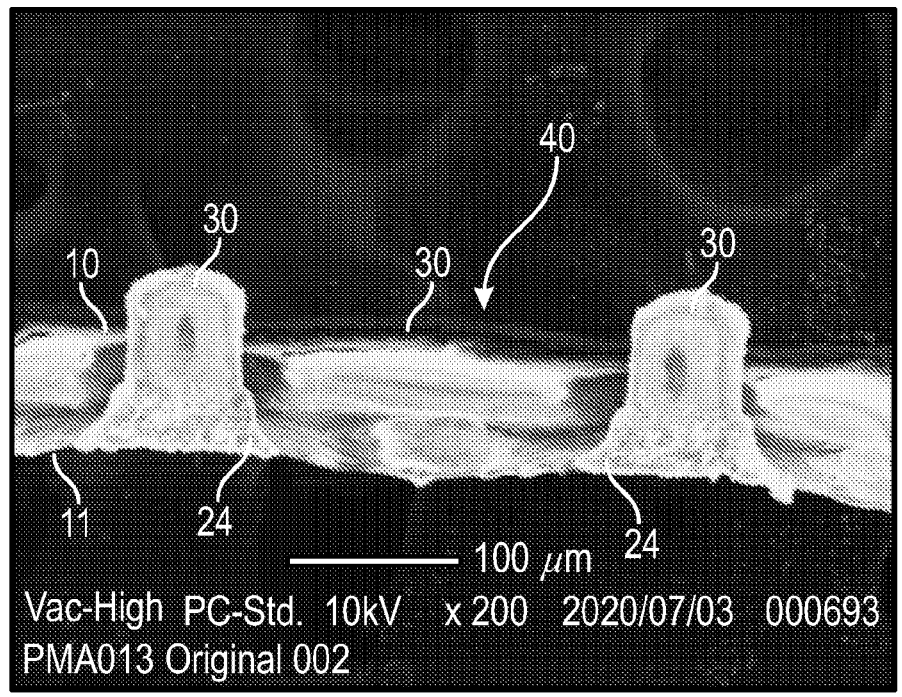
FIGS. 6A and 6B are additional close-up images of an optical film with microreplicated features, in accordance with an embodiment of the present description.
Figure 6B:
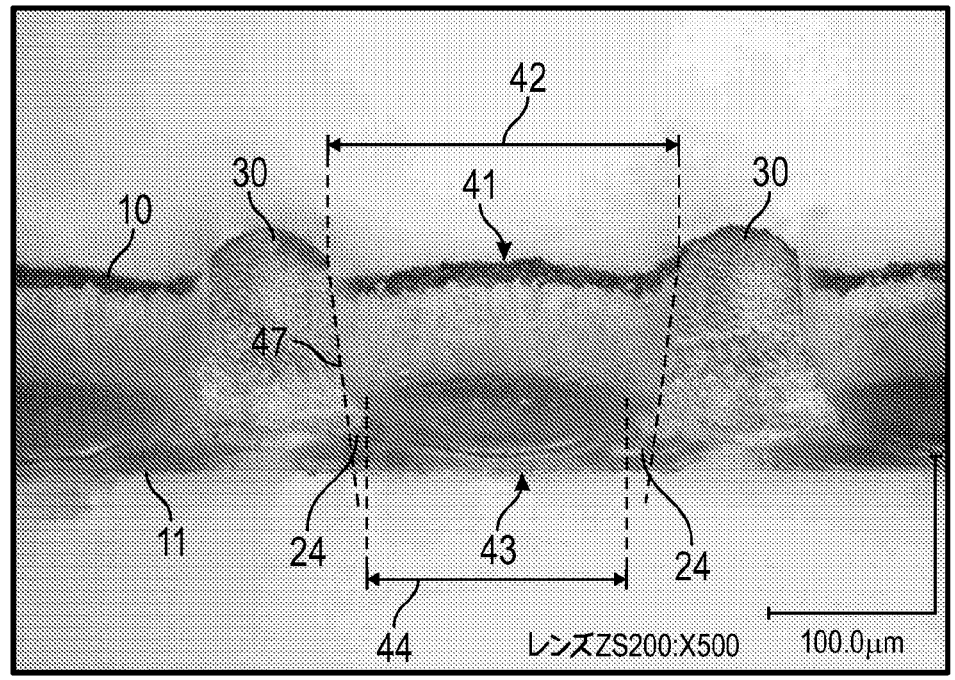

FIGS. 5A, 5B, 6A, and 6B are actual close-up images of an optical film with microreplicated features, according to the present description. The figures show the features of optical film 100 from various angles and in cross-section (FIGS. 5B, 6A, and 6B). The figures should be viewed together for the following discussion and features common across two or more of the figures (i.e., like-numbered components) shall be assumed to have a similar function unless otherwise specified. FIG. 5A shows a "top view" of optical film 100 and a plurality of through-holes 40. Each through-hole 40 has a first opening 41 having a first maximum dimension 42 and a second opening 43 with a second maximum dimension 44. In the embodiment shown in FIG. 5A, each of the first openings 41 are surrounded by and defined by four ridges 30 which extend between, and are recessed relative to, a plurality of posts 20. Lip 24 can be seen surrounding each second opening 43.

FIG. 5B shows a cross-sectional image of the optical film 100, cut through the middle of through-hole 40, showing the posts 20 with ridge 30 spanning between them. Posts 20 extend above ridge 30 and above first major surface 10. Second opening 43 on second major surface 11 features lip 24 extending out from the sidewalls of the hole into the opening.

FIGS. 6A and 6B are additional cross-sectional images showing through-hole 40 surrounded (on three sides, due to the cross-section) by ridges 30, which define the perimeter of first opening 41 on the first major surface 10. Lips 24 extend out from and define the maximum dimension 44 of the second opening 43. Sidewalls 47 may have a slope that has a slight draft angle, typically within ±10 degrees of vertical. In some embodiments, sidewalls 47 may be substantially flat, and in other embodiments sidewalls 47 may have a curvature, especially as they approach lip 24, or other non-planar features and/or deformations.

Figure 7:
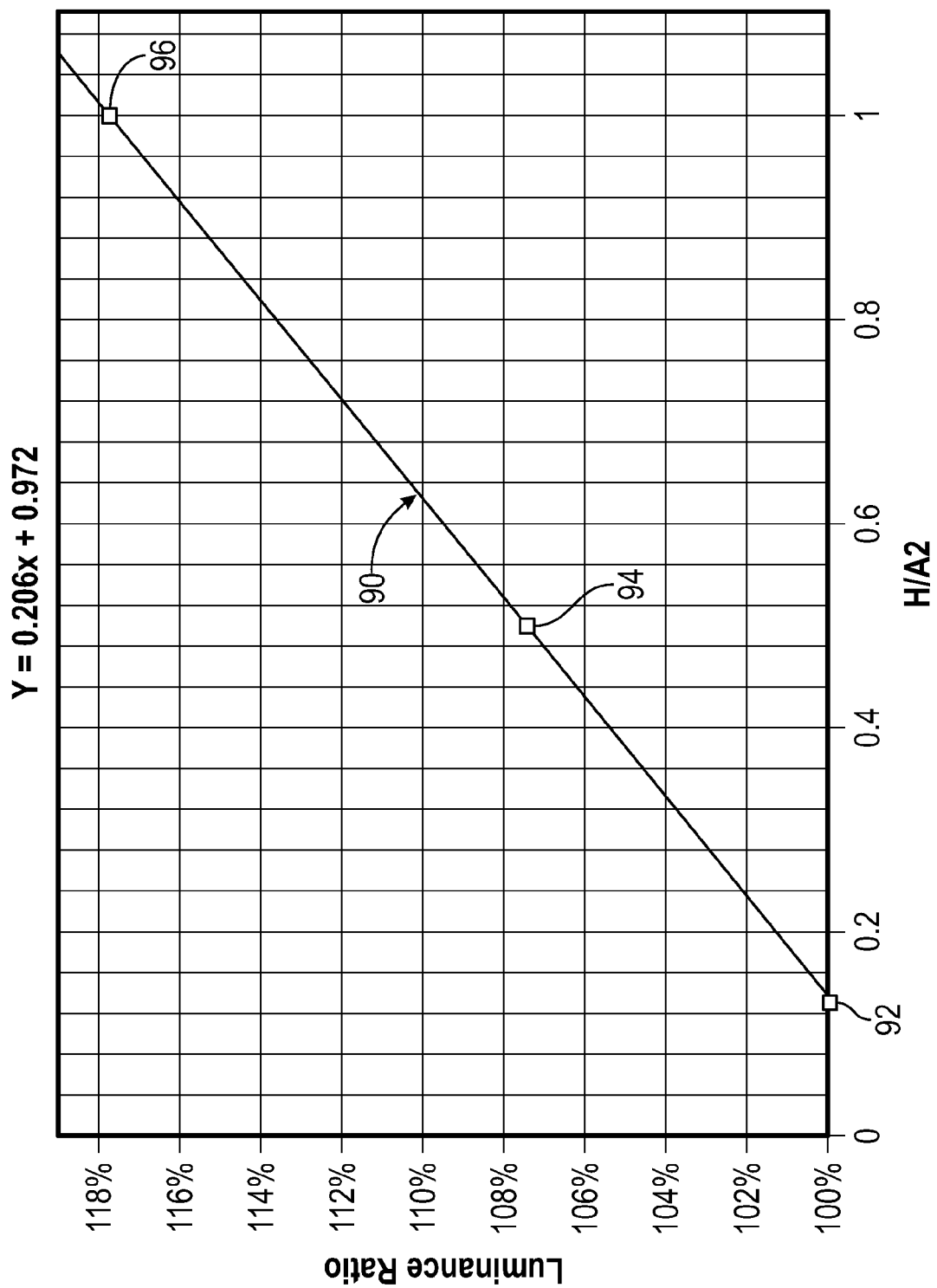
FIG. 7 is a plot showing luminance performance for various configurations of the microreplicated features, in accordance with an alternate embodiment of the present description.

FIG. 7 is a plot showing luminance improvement (i.e., luminance ratio compared to a reference value measured with no optical film present, or an optical film with no structures, representing 100%) for values of the ratio H/A2 (i.e., the ratio of the height of the through-hole, H, to the open area, A2 of the second opening). The three points shown are point 92, representing an approximate value of H/A2 of 0.13, point 94, representing an approximate value of H/A2 of 0.5, and point 96, representing an approximate value of H/A2 of 1.0. The plot of FIG. 7 shows increasing performance (i.e., increasing luminance ratio) starting at an H/A2 value of about 0.13 increasing up to an increase of nearly 18% when the ratio approach 1.0.

FIG. 8 is a plot comparing the peak brightness values for a display with and without an optical film as described herein disposed on the backlight. Plot 95 represents the plot of peak brightness shown for an LED without an optical film in place and shows a peak brightness value of approximately 21000 cd/m$^2$ (candela per square meter, also known as a nit). Plot 97 represents the plot of peak brightness shown for the same LED with an optical film disposed over the LED and shows a peak brightness value of approximately 23000 cd/m$^2$, which represents an approximate gain in peak brightness value of 8.7%. It should be noted that the brightness value measured at any given point above the optical film may vary based on a particular LED's alignment with the through-hole, and that peak brightness values with the optical film in place may come result when the LED is substantially aligned with the through-hole. At other times, such as when a post (such as post 20 as shown in FIG. 5A) aligns with the LED, the brightness value may decrease significantly from the peak brightness value shown here. It is a combination of increases in peak brightness from some LEDs and increased scattering from other LEDs that contribute to both an overall increase in average luminance across the display and a corresponding increase in uniformity across the display.

Figure 9A:
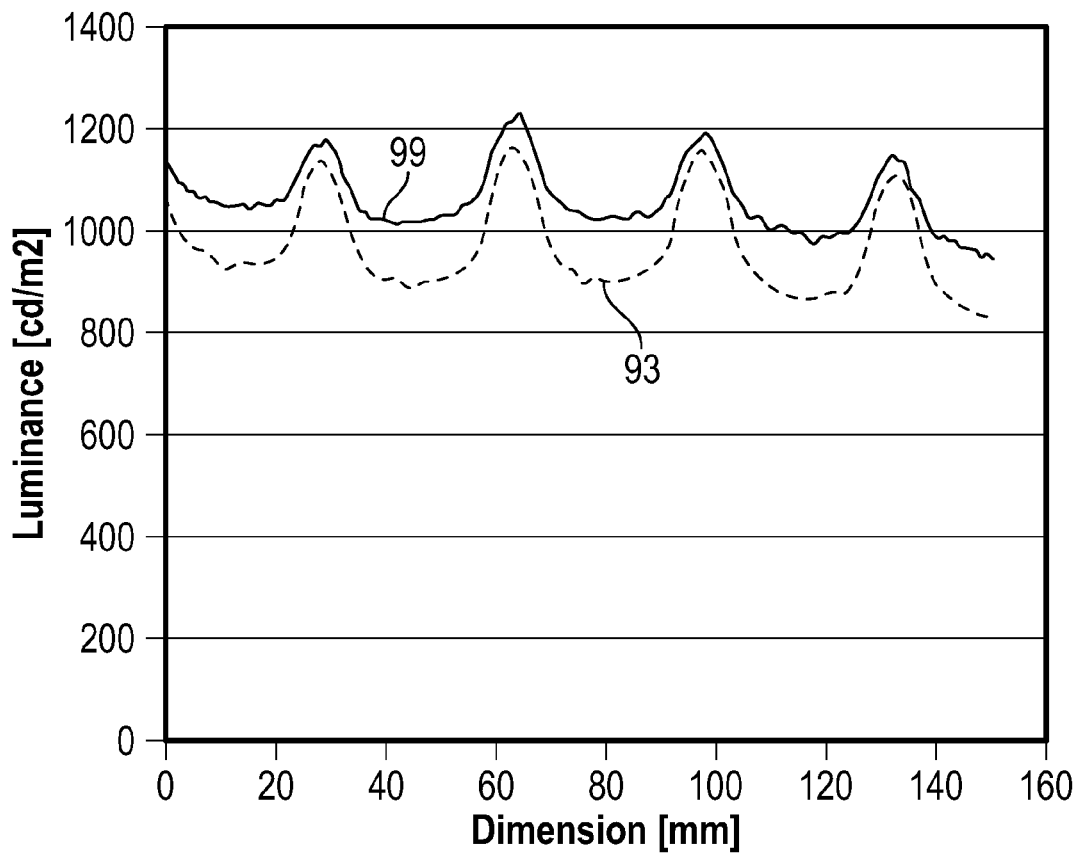
FIGS. 9A and 9B are plots comparing display uniformity performance for a display with and without an optical film disposed on the backlight, in accordance with an embodiment of the present description.
Figure 9B:
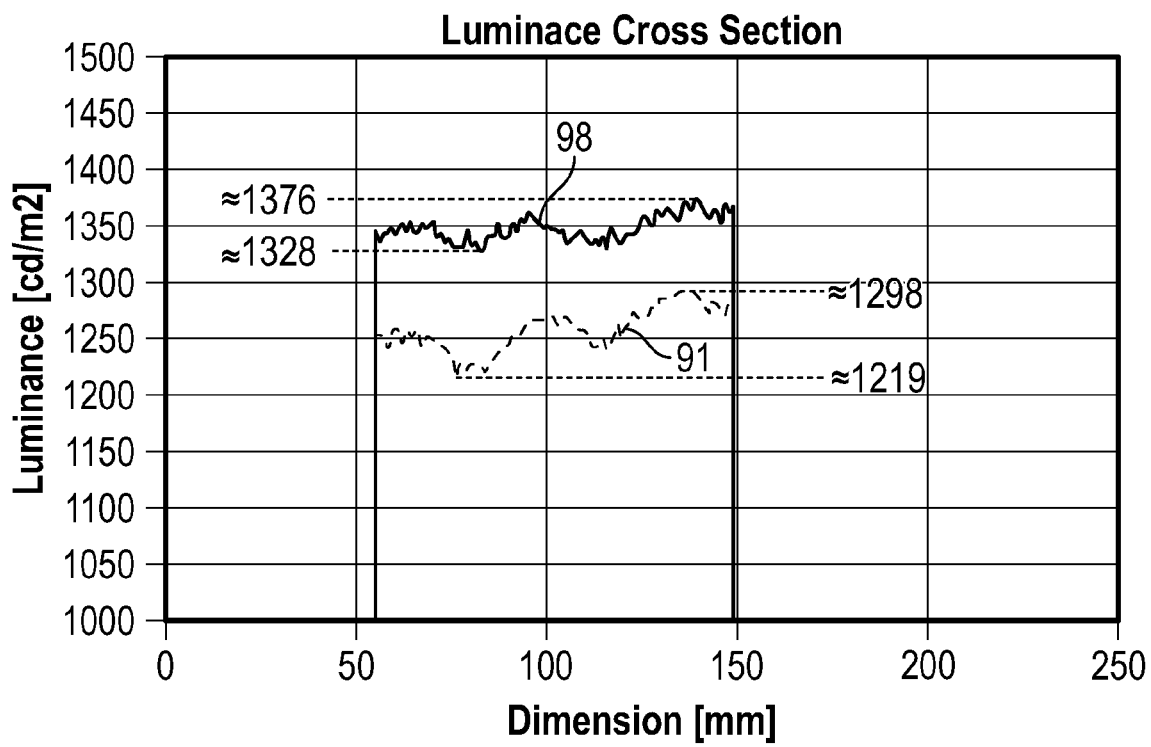

Finally, FIGS. 9A and 9B are plots comparing display uniformity performance for a display with and without an optical film disposed on the backlight. FIG. 9A shows the plots of luminance values measured across a display for a backlight featuring the microreplicated optical film according to the present description 99 and the values measured across a display for a backlight where the microreplicated film was replaced with an optically-transparent, non-structured film of polyethylene terephthalate (PET). The values for the microreplicated optical film 99 show both an increase in luminance values across the display over the featureless PET film but also an increase in uniformity (i.e., a smaller difference in contrast between minimum and maximum luminance values). FIG. 9B shows another example measurement using a microreplicated optical film 98 and a featureless PET film 91. The minimum and maximum luminance values shown by these plots, as well as the LD luminance uniformity values they represent, are summarized in Table 1. It should be noted that, in terms of uniformity, a smaller contract value is better than a larger contrast value. As shown in Table 1, the measured performance for the microreplicated optical film (i.e., film featuring the through-holes of, for example, FIG. 1A) showed an approximate improvement in contrast of about 2.88%. Similar example films were measured and showed improvements of at least 2.88% and often greater improvement values. These examples are discussed in more detail elsewhere herein.

TABLE 1

Luminance Contrast Comparison

|  | Microrep. Film | PET |
|---|---|---|
| Maximum Value | 1375.74 cd/m2 | 1298.31 cd/m2 |
| Minimum Value | 1327.62 cd/m2 | 1218.98 cd/m2 |
| LED Luminance Uniformity | 103.62% | 106.51% |
| Difference |  | 2.88% |

Examples

Table 2 shows the results of luminance contract measurements taken for a number of Example films. Each of the Example films listed in Table 2 were made using a microreplication process, and all luminance measurements were made with a Konica Minolta CA-2500 2D color analyzer. All example microreplicated films measured showed an improvement in luminance contrast of at least about 2.88% ranging up to about 11.29%. The Reference Film used in each example below was a featureless (no through-holes or structure), optically transparent polyethylene terephthalate (PET) film.

TABLE 2

Example Film Results

| Example Film # | Backlight Set-Up (Combined Films Present) | Location of Microreplicated Film | Microreplicated Film Material | Thickness of Microreplicated Film | Hole Details | Ref. Film LED Uniformity Increase over Reference | Microrep. Film LED Uniformity Increase over Reference | Percent Improv. |
|---|---|---|---|---|---|---|---|---|
| Example1 | Polarizer film, reflective polarizer(3M APF-V3), Stacked type prism film(3M ASOC4-HH), diffuser sheet(3M UDF), Color conversion sheet(Dexerials), blue light transmissive film(3M BLT) | Microreplicated film located between color conversion sheet and blue light transmissive film(3M BLT) | Polypropylene | 150 um | with hole, φ: 44 um | 142% | 130% | 11.29 |
| Example2 | | Microreplicated film located between diffuser sheet(3M UDF2) and color conversion sheet | Polypropylene | 150 um | with hole, φ: 44 um | 109% | 103% | 5.61 |
| Example3 | Stacked type prism film(3M ASOC4-HH), Diffuser sheet(3M UDF), Color conversion sheet(Dexerials) | | Polypropylene | 150 um | with hole, φ: 44 um | 122% | 115% | 7.52 |
| Example4 | Polarizer film, reflective polarizer(3M APF-V3), Stacked type prism film(3M ASOC4-HH), diffuser sheet(3M UDF), Color conversion sheet(Dexerials), blue light transmissive film(3M BLT) | Microreplicated film located between diffuser sheet(3M UDF2) and color conversion sheet | Polypropylene | 150 um | with hole, φ: 44 um | 106.5% | 104% | 2.88 |
| Example5 | Stacked type prism film(3M ASOC4-HH), diffuser sheet(3M UDF), Color conversion sheet(Dexerials) | Microreplicated film located under color conversion sheet | Polypropylene | 300 um(two layer MrPF 150 um) | with hole, φ: 44 um | 115% | 109% | 5.21 |
| Example6 | Polarizer film, reflective polarizer(3M APF-V3), Stacked type prism film(3M ASOC4-HH), diffuser sheet(3M UDF), Color conversion sheet(Dexerials), blue light transmissive film(3M BLT) | Microreplicated film located between diffuser sheet(3M UDF2) and color conversion sheet | Polypropylene | 276 um | with hole, ellipse. 243 × 180 um | 119% | 113% | 6.16 |
| Example7 | | | Polypropylene | 282 um | without hole | 119% | 113% | 5.69 |
| Example8 | | Microreplicated film located under blue light transmissive film(3M BLT) | Polypropylene | 276 um | with hole, ellipse. 243 × 180 um | 117% | 110% | 6.54 |

TABLE 2-continued

Example Film Results

| Example Film # | Backlight Set-Up (Combined Films Present) | Location of Microreplicated Film | Microreplicated Film Material | Thickness of Microreplicated Film | Hole Details | Ref. Film LED Uniformity Increase over Reference | Microrep. Film LED Uniformity Increase over Reference | Percent Improv. |
|---|---|---|---|---|---|---|---|---|
| Example9 | | | Polypropylene | 282 um | without hole | 117% | 113% | 3.83 |
| Example10 | | Microreplicated film located between diffuser sheet(3M UDF2) and color conversion sheet | Polypropylene | 150 um | with hole, φ: 44 um | 1.16 | 113% | 3.82 |
| Example11 | | | Polypropylene & Acrylic OCA 10um & PET 25 um | 150 um | with hole, but masked by OCA& PET film | 1.16 | 112% | 4.05 |
| Example12 | | Microreplicated film located under blue light transmissive film(3M BLT) | Polypropylene | 150 um | with hole, φ: 44 um | 115% | 109% | 5.81 |
| Example13 | | | Polypropylene & Acrylic OCA 10 um & PET 25 um | 150 um | with hole, but masked by OCA& PET film | 115% | 110% | 4.81 |

Terms such as "about" will be understood in the context in which they are used and described in the present description by one of ordinary skill in the art. If the use of "about" as applied to quantities expressing feature sizes, amounts, and physical properties is not otherwise clear to one of ordinary skill in the art in the context in which it is used and described in the present description, "about" will be understood to mean within 10 percent of the specified value. A quantity given as about a specified value can be precisely the specified value. For example, if it is not otherwise clear to one of ordinary skill in the art in the context in which it is used and described in the present description, a quantity having a value of about 1, means that the quantity has a value between 0.9 and 1.1, and that the value could be 1.

Terms such as "substantially" will be understood in the context in which they are used and described in the present description by one of ordinary skill in the art. If the use of "substantially equal" is not otherwise clear to one of ordinary skill in the art in the context in which it is used and described in the present description, "substantially equal" will mean about equal where about is as described above. If the use of "substantially parallel" is not otherwise clear to one of ordinary skill in the art in the context in which it is used and described in the present description, "substantially parallel" will mean within 30 degrees of parallel. Directions or surfaces described as substantially parallel to one another may, in some embodiments, be within 20 degrees, or within 10 degrees of parallel, or may be parallel or nominally parallel. If the use of "substantially aligned" is not otherwise clear to one of ordinary skill in the art in the context in which it is used and described in the present description, "substantially aligned" will mean aligned to within 20% of a width of the objects being aligned. Objects described as substantially aligned may, in some embodiments, be aligned to within 10% or to within 5% of a width of the objects being aligned.

All references, patents, and patent applications referenced in the foregoing are hereby incorporated herein by reference in their entirety in a consistent manner. In the event of inconsistencies or contradictions between portions of the incorporated references and this application, the information in the preceding description shall control.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. A backlight for providing illumination along a first direction to a display disposed thereon, the backlight comprising:
   a plurality of spaced apart discrete light sources arranged in rows and columns of the light sources and configured to face the display; and
   an optical film disposed on and above the light sources and below and proximate a first plane, the optical film and the first plane configured to be disposed between the display and the light sources, the optical film comprising a plurality of through-holes arranged in rows and columns of the through-holes and extending between first and second major surfaces of the optical film, each through hole having a first opening at the first major surface and having a first open area, A1, and a second opening at the second major surface and having a second open area, A2, each through-hole having a length, H, along the first direction such that the ratio of H/A2 is greater than or equal to about 0.13, such that:
   when all the light sources emit light, the light emitted by all the light sources has a first overall peak intensity in the first plane, and a first brightness uniformity across the first plane, and
   in the absence of the optical film, the light emitted by all the light sources has a second overall peak intensity in the first plane, and a second brightness uniformity across the first plane, wherein:
   the first and second overall peak intensities are different by less than about 20%; and the first brightness uniformity exhibits an improvement over the second brightness uniformity by at least 2.8%.

2. The backlight of claim 1, wherein A1 is greater than A2.

3. The backlight of claim 2, wherein when the optical film is disposed such that A1 faces the light sources, a first average luminance in the first plane is smaller and the first brightness uniformity is greater, and when the optical film is disposed such that A2 faces the light sources, the first average luminance in the first plane is greater and the first brightness uniformity is greater.

4. The backlight of claim 1, wherein A1 is substantially equal to A2.

5. The backlight of claim 1, wherein the slope of an inner wall of each of the through-holes of the plurality of through-holes is within ±15 degrees of the first direction.

6. The backlight of claim 1, further comprising a diffusing film disposed between the light sources and the optical film.

7. The backlight of claim 1, wherein the light emitted by all the light sources has a first average luminance in the first plane, and, in the absence of the optical film, the light emitted by all the light sources has a second average luminance in the first plane, such that the first average luminance is greater than or equal to the second average luminance.

8. The backlight of claim 1, wherein a shape of at least a portion of the plurality of through-holes is substantially a truncated square pyramid.

9. The backlight of claim 1, wherein a shape of at least a portion of the plurality of through-holes is substantially a truncated cone.

10. The backlight of claim 1, wherein a shape of at least a portion of the plurality of through-holes is substantially a cylinder.

11. The optical film of claim 1, wherein a shape of at least a portion of the plurality of through-holes is substantially a rectangular prism.

12. An optical film, comprising:
a structured first major surface opposite a second major surface, the first major surface comprising a plurality of posts arranged in rows and columns of the posts, and a plurality of ridges extending between, and recessed relative to, the posts; and
a plurality of through-holes extending between the first and second major surfaces, each through-hole comprising:
a first opening at the first major surface defined by, and recessed relative to, a number of ridges in the plurality of ridges, the first opening having a first maximum dimension; and
a second opening at the second major surface and having a second maximum dimension different than the first maximum dimension.

13. The optical film of claim 12, wherein the first opening of each through-hole is defined and surrounded by four ridges in the plurality of ridges.

14. The optical film of claim 12, wherein each through-hole of the plurality of through-holes defines a distance, H, between the first opening and the second opening, the second opening has an open area A2, and the ratio of H/A2 is greater than or equal to about 0.13.

15. A backlight for providing illumination to a display, comprising:
a plurality of spaced apart discrete light sources arranged in rows and columns of the light sources and configured to face the display; and
the optical film of claim 12 disposed on the plurality of spaced apart discrete light sources and below and proximate a first plane.

16. The backlight of claim 15, wherein when all the light sources emit light, the light emitted by all the light sources has a first overall peak intensity in the first plane, and a first brightness uniformity across the first plane, and in the absence of the optical film, the light emitted by all the light sources has a second overall peak intensity in the first plane, and a second brightness uniformity across the first plane, wherein:
the first and second overall peak intensities are different by less than about 20%; and
the first brightness uniformity exhibits an improvement over the second brightness uniformity by at least 2.8%.

17. The backlight of claim 15, wherein the light emitted by all the light sources has a first average luminance in the first plane, and, in the absence of the optical film, the light emitted by all the light sources has a second average luminance in the first plane, such that the first average luminance is greater than or equal to the second average luminance.

18. The optical film of claim 12, wherein a shape of at least a portion of the plurality of through-holes is substantially a shape selected from a truncated square pyramid, a truncated cone, a cylinder, and a rectangular prism.

19. An optical film, comprising:
a structured first major surface opposite a second major surface, the first major surface comprising a plurality of posts arranged in rows and columns of the posts, and a plurality of ridges extending between, and recessed relative to, the posts; and
a plurality of recesses extending from the first major surface into the optical film in a thickness direction of the optical film, each recess comprising:
a first open end at the first major surface defined by, and recessed relative to, a number of ridges in the plurality of ridges, the first open end having a first maximum dimension; and
a second closed end recessed from the first open end by a distance D and having a second maximum dimension different than the first maximum dimension.

20. A backlight for providing illumination to a display, comprising:
a plurality of spaced apart discrete light sources arranged in rows and columns of the light sources and configured to face the display; and
the optical film of claim 19 disposed on the plurality of spaced apart discrete light sources and below and proximate a first plane.

* * * * *